No. 761,302. PATENTED MAY 31, 1904.
A. JEFFERY.
PAYING APPARATUS.
APPLICATION FILED JUNE 10, 1903.
NO MODEL.
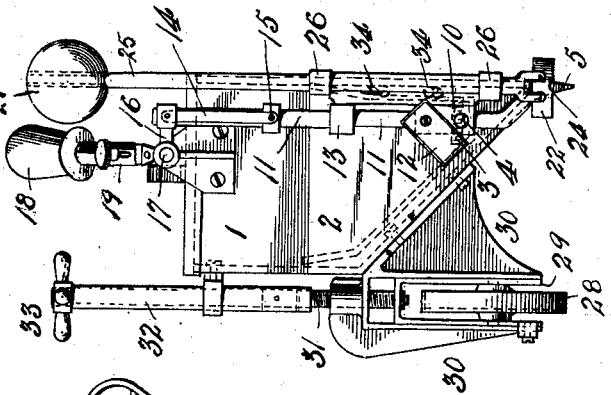
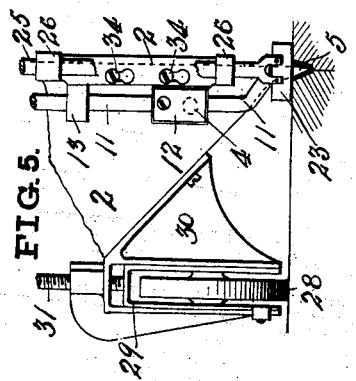
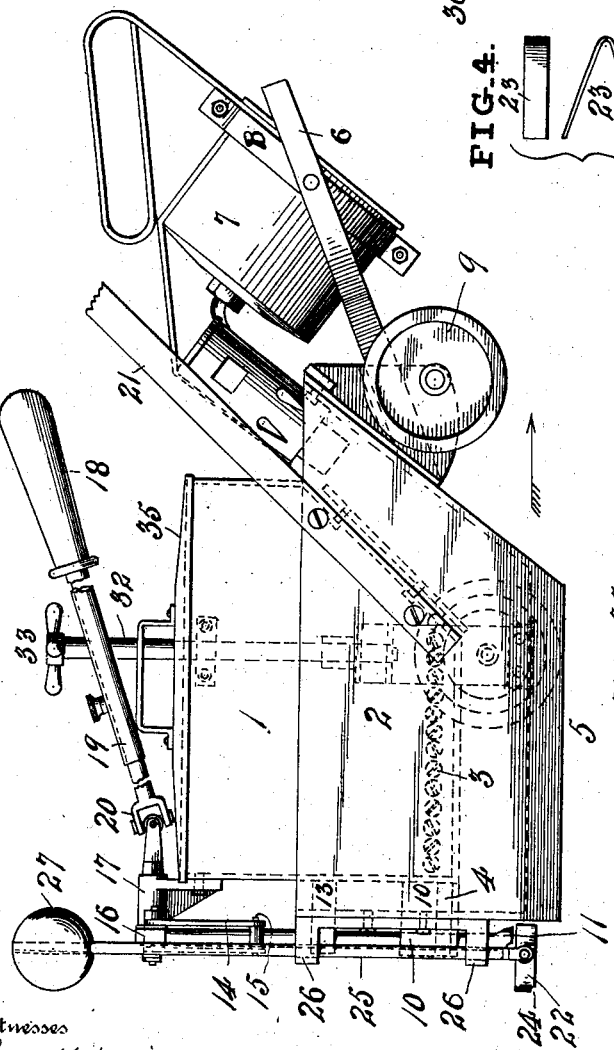
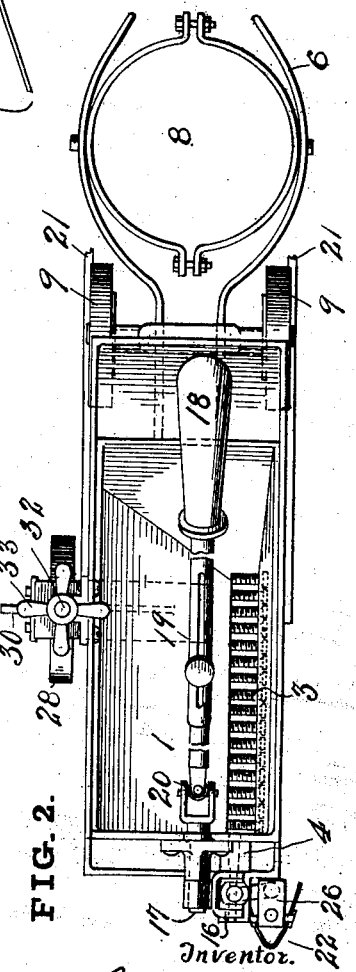
Witnesses
Chas. K. Davis.
Esther C. Carrick
Inventor
Arthur Jeffery
By Fenelon B. Brock
Attorney No. 761,302.

Patented May 31, 1904.

UNITED STATES PATENT OFFICE.

ARTHUR JEFFERY, OF HAYWARDS HEATH, ENGLAND.

PAYING APPARATUS.

SPECIFICATION forming part of Letters Patent No. 761,302, dated May 31, 1904.

Application filed June 10, 1903. Serial No. 160,871. (No model.)

*To all whom it may concern:*

Be it known that I, ARTHUR JEFFERY, a subject of the King of England, and a resident of Muster Green, Haywards Heath, county of Sussex, England, have invented a new and useful Improvement in Paying Apparatus, of which the following is a specification.

My invention relates to paying-machines.

The object of the invention is to provide a machine adapted to move over decks or floors and fill the seams with a paying material, such as marine-glue or the like, the construction being such as will permit new decks to be filled with paying material or the removal of old paying material. In the last operation the old paying material may be melted and reintroduced into the seam, together with a quantity of new paying material sufficient to fill the seam.

With these objects in view my invention consists of the following construction and the combination of parts, the details of which will first be fully described and the features of novelty thereafter set forth and claimed.

Figure 1 is a side elevation of an apparatus embodying my invention. Fig. 2 is a plan view thereof. Fig. 3 represents an end elevation of the same. Fig. 4 represents a top and a plan view of a modified form of plow. Fig. 5 is an end view of the apparatus, partly broken away, with the deck in section.

In the drawings, 1 represents a receptacle for holding the paying material mounted in a combustion-chamber 2. The bottom of receptacle 1 and burner-chamber 2 are wedge-shaped, as seen in end view, one side thereof being preferably vertical and the other inclined for a purpose hereinafter described. Receptacle 1 is provided with a false bottom, in this instance composed of a series of screws 3, arranged horizontally side by side with spaces between the same. The paying material rests upon this false bottom in the hopper 1 and upon being melted passes through the false bottom 3 to the bottom of the receptacle and flows out through a passage 4, hereinafter described.

Receptacle 1 preferably fits the side walls of combustion-chamber 2; but the latter projects upwardly and rearwardly beyond the receptacle 1, forming a flue-passage for the heating media.

The bottom of combustion-chamber 2 is prolonged into a horn or heating-iron 5, which, rendered hot by the products of combustion, enters and traverses the seam of the deck or floor, more particularly described further on.

There is a supporting-frame 6 for the lamp or burner projecting at one end and is preferably provided with a pivotal trunnioned support 8, carrying the burner 7, which allows the burner to be projected into the combustion-chamber or removed therefrom by tipping the burner on the trunnions.

At one end of the apparatus is secured wheels 9 upon a suitable frame, upon which when the machine is in use the apparatus may be transported by tipping that side downwardly until the wheels come in contact with the deck and the iron or horn 5 raised sufficiently to clear the same.

The discharge-pipe 4 of receptacle 1 terminates in a box 10, through which a delivery-spout 11 discharges the melted paying material over the seam being traversed. Discharge-pipe 4 extends clear through box 10, the outer end of the box being provided with a removable cover 12, whereby said tube may be cleaned. Delivery-spout 11 is provided with an opening which registers with the opening 4 and allows the paying material to run out through the spout. I prefer to reciprocate the spout in bearings 13, and for this purpose the spout 11 is extended upwardly and connected with link or links 14, connected at 15 on the spout at one end and at the other to a rock-arm 16, journaled in bearings 17, a handle 18 being provided for rocking the bearing 17.

The handle 18 in this instance is preferably formed of telescopic or other adjustable intermediate portion 19, and a universal joint 20 connects the part 19 with the bearing 17. The drawings show the handle and arm broken away. It extends outwardly a sufficient distance for convenient manipulation by the attendant who is operating the machine. 21 represents the main handle or operating-arm, which is shown broken away. This arm also extends outwardly and terminates in the handle portion, its handle and the handle 18 being preferably disposed adjacent to each other in practice.

Adjacent to the discharge end of the spout 11 is an implement 22, which operates as a collector when disposed in the position shown in Figs. 1 and 2. This implement 22 is adapted to be reversed, whereby its apex or nose is reversed and placed next the horn or iron 5, when it operates as an ejector by plowing or brushing aside the old paying material in repairing decks or floors. I may use the same implement 22 for performing both operations, or a separate implement for each operation may be adjustably set, as shown, for performing the desired operation. For brushing or sweeping aside the old material I prefer the form of implement 23, (shown in Fig. 4,) the apex or nose of the same being somewhat sharper than that of implement 22 and not being notched, as is the implement 22, at the lower side of its apex at the point 24. These tools 22 and 23 are carried by a rod 25, slidably mounted in bearings 26 and provided with a weight 27 or spring for holding the tool in contact with the deck or floor.

In operation the horn or iron 5 supports the apparatus upon one side within the seam of the deck being treated, the other side of the machine being supported upon a wheel 28, mounted in a housing 29, vertically adjustable in a bracket 30. Bracket 30 is secured to the side of the machine and is preferably provided with a threaded opening through which passes adjusting-screw 31, turning in the housing 29, its upper end being continued in an arm 32, provided with a handle or wheel 33, by means of which the screw 31 may be rotated and the wheel 28 adjusted in height with respect to the horn 5. In the drawings the bottom of the horn is shown horizontal with the tread of the wheel 28. When the horn drops or is inserted in the seam of the deck or floor, the wheel 28 is adjusted upwardly, so that it will be in a line horizontal with that part of the horn which is in line with the top of the deck or floor. The wheel 28 permits the adjustment of the machine to different depths of seams.

In operation the machine travels in the direction of the arrow, Fig. 1, the front of the horn being inclined or prow-shaped, so as to easily traverse the seam. The operator in this instance stands in front of the machine and pulls it toward him. When the burner is lighted, the products of combustion are thrown downwardly through the front of the combustion-chamber, around the bottom of the receptacle 1, and emerge upwardly around the pipe 4 and adjacent to the delivery-spout 11. The flame heats the iron and melts the paying material or glue resting on the false bottom 3, liquefying a portion of the paying material, which flows along the bottom of the receptacle 1, out through discharge-pipe 4, and down through delivery-pipe 11 into the seam in rear of the horn 5 as it advances. Any excess of paying material is caught by the collector 22 and concentrated over the seam, the notch 24 in the rear of the nose of the collector aiding in this purpose. The machine will operate in this way upon new decks which have never been payed or in repairing the seams of decks which have already been payed, the horn or iron 5 melting the old material therein and the collector gathering up that portion which is thrown to the sides of the seam and redepositing it over the seam. In this latter operation generally an additional supply of paying material is needed, and this is supplied by adjusting the valve of the discharge-spout through the handle 18. If it is desired to eject old paying material, the plow or tool 22 is reversed or the form of plow 23, Fig. 4, is used, with the nose next to the iron 5. The plow then acts to remove the old paying material from the seam as the heated iron 5 melts it and causes it to exude therefrom. When the machine is not in use, it is tilted over on the wheels 9 and freely transported.

The plow or implement 22 or 23, with its operating-rod 25, weight or spring 27, and its bearings 26, is preferably made removable by means such as the bayonet-joints 34. The bearings 13 and box 10 are formed with the receptacle 1 and may be removed through the combustion-chamber 2 by disconnecting the bolts or fastenings and moving the receptacle in the direction of the arrow. The wheels are generally made of wood, with metallic rims, and a suitable cover 35 is provided for the receptacle 1.

What I claim as new is—

1. In a paying apparatus, the combination of a movable adhesive-containing vessel provided with a heating-horn on one side of the vessel, a support-wheel on the opposite side, and means for heating the apparatus.

2. In a paying apparatus, the combination of a movable adhesive-containing vessel provided with a heating-horn and an adjustable support, and means for heating the apparatus.

3. In a paying apparatus, the combination of a movable vessel provided with a heating-horn upon one side and an adjustable support upon the opposite side, and means for heating the apparatus.

4. In a paying apparatus, the combination of a movable vessel provided with a heating-horn forming virtually a lower prolongation thereof, a combustion-chamber interposed between said vessel and said horn and means for heating the apparatus.

5. In a paying apparatus, the combination of a movable vessel having a heating-horn substantially parallel with a vertical side of the vessel, and means for heating the apparatus.

6. In a paying apparatus, the combination of a movable vessel provided with a heating-horn adapted to enter the seam of a floor, means for heating the horn, and a movable support for the apparatus when it is transported and not in use, located above the horn.

7. In a paying apparatus, the combination of a movable adhesive-containing vessel provided with a heating-horn, having its outer side vertical and adapted to enter the seam of a deck or floor, and means for heating the apparatus.

8. In a paying apparatus, the combination of a movable adhesive-containing vessel provided with a heating-horn on one side of the vessel, a support-wheel on the opposite side, a plow in the path of the horn, and means for heating the apparatus.

9. In a paying apparatus, the combination of a movable adhesive-containing vessel provided with a heating-horn and an adjustable support, a plow in the path of the horn, and means for heating the apparatus.

10. In a paying apparatus, the combination of a movable vessel provided with a heating-horn upon one side and an adjustable support upon the opposite side, a plow in the path of the horn and means for heating the apparatus.

11. In a paying apparatus, the combination of a movable vessel provided with a heating-horn forming virtually a lower prolongation thereof, a plow in the path of the horn, a combustion-chamber interposed between said vessel and said horn and means for heating the apparatus.

12. In a paying apparatus, the combination of a movable vessel having a heating-horn substantially parallel with a vertical side of the vessel, a plow in the path of the horn, and means for heating the apparatus.

13. In a paying apparatus, the combination of a movable vessel provided with a heating-horn adapted to enter the seam of a floor, a plow in the path of the horn, means for heating the horn, and a movable support for the apparatus when it is transported and not in use, located above the horn.

14. In a paying apparatus, the combination of a movable adhesive-containing vessel provided with a heating-horn, having its outer side vertical and adapted to enter the seam of a deck or floor, a plow in the path of the horn, and means for heating the apparatus.

15. In a paying apparatus, the combination of a movable adhesive-containing vessel provided with a heating-horn on one side of the vessel, a support-wheel on the opposite side, a reversible plow in the path of the horn, and means for heating the apparatus.

16. In a paying apparatus, the combination of a movable adhesive-containing vessel provided with a heating-horn and an adjustable support, a reversible plow in the path of the horn, and means for heating the apparatus.

17. In a paying apparatus, the combination of a movable vessel provided with a heating-horn upon one side and an adjustable support upon the opposite side, a reversible plow in the path of the horn and means for heating the apparatus.

18. In a paying apparatus, the combination of a movable vessel provided with a heating-horn forming virtually a lower prolongation thereof, a reversible plow in the path of the horn, a combustion-chamber interposed between said vessel and said horn and means for heating the apparatus.

19. In a paying apparatus, the combination of a movable vessel having a heating-horn substantially parallel with a vertical side of the vessel, a reversible plow in the path of the horn, and means for heating the apparatus.

20. In a paying apparatus, the combination of a movable vessel provided with a heating-horn adapted to enter the seam of a floor, a reversible plow in the path of the horn, means for heating the horn, and a movable support for the apparatus when it is transported and not in use, located above the horn.

21. In a paying apparatus, the combination of a movable vessel having a heating-horn for the seams of floors, and a discharge-spout and a plow in the path of the horn.

22. In a paying apparatus, the combination of a movable vessel having a heating-horn, a plow, and means for pressing the plow downwardly.

23. In a paying apparatus, the combination of a movable vessel having a foraminous bottom, a melting-chamber below said bottom, and a horn below the melting-chamber.

24. In a paying apparatus, the combination of a movable vessel having a foraminous bottom, a melting-chamber below said bottom, a heating-horn below the melting-chamber, and a plow in line with the horn.

25. In a paying apparatus, the combination of a movable vessel, means for heating the same, a discharge-opening for the vessel, a discharge tube and valve communicating with the discharge-opening, and a plow in the path of the discharge-tube.

26. In a paying apparatus, the combination of a movable vessel having a discharge-opening, means for heating the vessel, and a plow, discharge tube and valve detachably connected to the vessel.

27. In a paying apparatus, the combination of a movable vessel having a heating-horn and provided with a discharge-opening and a vertical opening at right angles thereto, a cover for the end of said opening, a vertical discharge-tube having a lateral opening passing through said vertical opening and means for reciprocating the discharge-tube.

28. In a paying apparatus, the combination of a movable vessel having a heating-horn, a plow in the path of the horn, a discharge tube or valve for the vessel discharging in the line of the horn and plow, and handles for moving the vessel and operating the valve.

In testimony whereof I have affixed my signature in the presence of two witnesses.

ARTHUR JEFFERY.

Witnesses:
   JAS. H. BLACKWOOD,
   ESTHER E. CARRICK.